UNITED STATES PATENT OFFICE.

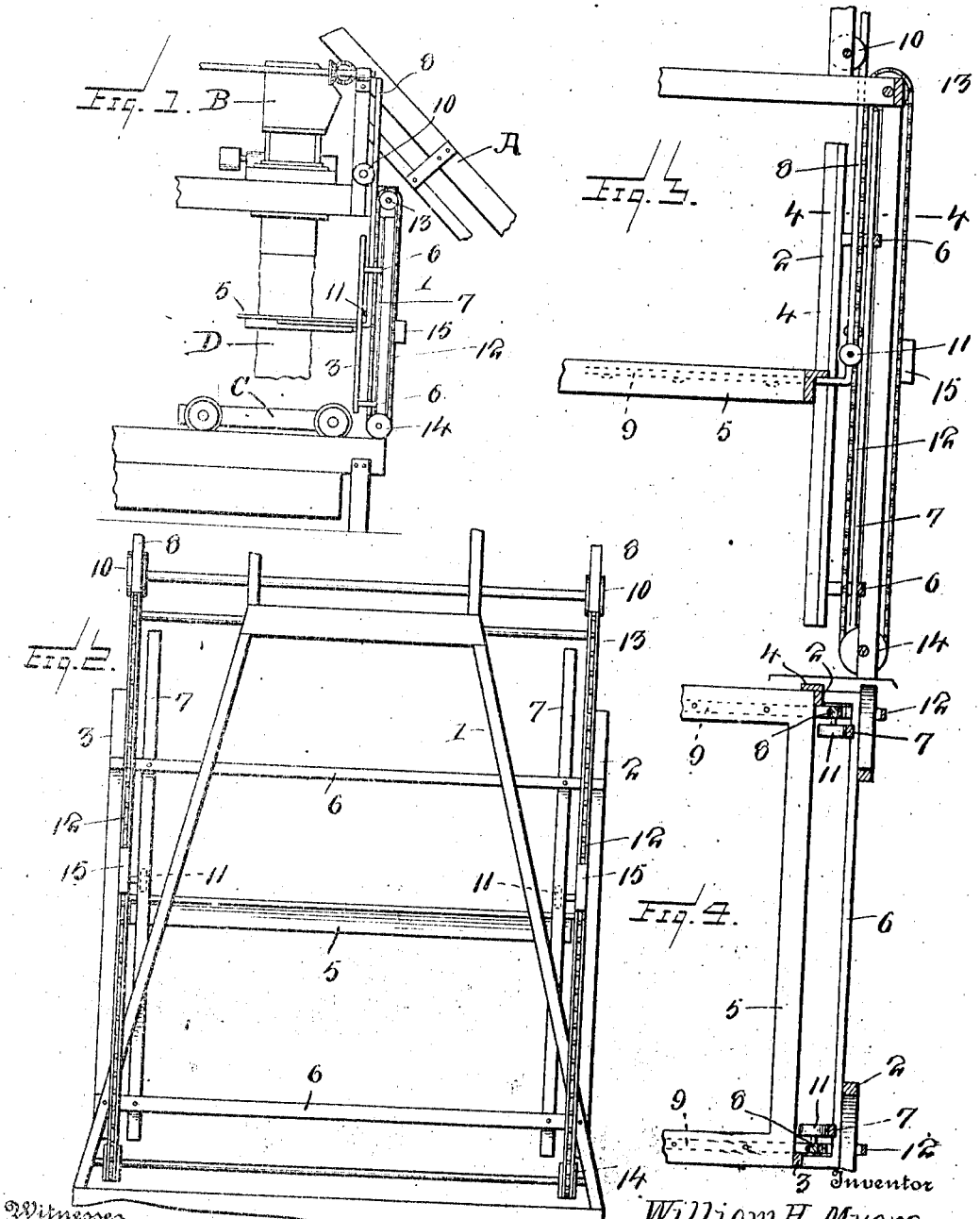

WILLIAM H. MYERS, OF MOUNT CLINTON, VIRGINIA.

FRUIT-PRESS CHARGER.

1,106,234.  Specification of Letters Patent.  Patented Aug. 4, 1914.

Application filed December 11, 1912. Serial No. 736,165.

*To all whom it may concern:*

Be it known that I, WILLIAM H. MYERS, a citizen of the United States, residing at Mount Clinton, in the county of Rockingham and State of Virginia, have invented new and useful Improvements in Fruit-Press Chargers, of which the following is a specification.

The invention relates generally to an improvement in machines for charging fruit presses and particularly to a means for supporting the form whereby the latter may be conveniently shifted from one position to the other when necessary within a minimum of time and labor.

In the present type of charger for fruit presses it is well understood that the form is applied for the building up of a proper layer of the fruit, then lifted to the upper position to permit the application of the rack, then reapplied to again build up a layer of fruit and so on until a sufficient number of layers have been made up.

In the present type of charger the form is manually lifted to the top of the guide frame and hooked in such position after each layer formation, and this requires considerable time and labor on the part of the operator.

It is the object of the present invention to so connect the form and mount it for counterbalanced movement that it may be readily shifted from operative to inoperative position or vice versa with one hand and without particular attention on the part of the operator, thereby materially reducing a very considerable item of labor and time in making up fruit layers for the press.

The invention in its preferred form of details will be described in the following specification, reference being had to the accompanying drawings, in which:—

Figure 1 is a side view of a portion of the fruit press charger illustrating my improvement. Fig. 2 is an enlarged broken end elevation of the same. Fig. 3 is an enlarged vertical section of the same. Fig. 4 is a cross section on the line 4—4 of Fig. 3.

Referring to the accompanying drawings, the present improvement is designed for connection with that end of the press carrying the guide frame 1 which, as well known, includes guide bars 2 and 3 the form of which is rabbeted at 4 to serve for coöperation with the edge of the fruit form 5 to accurately position the latter in each successive application thereof so that the fruit may be arranged in properly superimposed layers.

In connection with Fig. 1 and to identify the location of the improvement, I have shown conventionally a portion of the usual elevator A and grinder B, from which latter the fruit is delivered to the press or carriers C through a flexible chute D.

In applying my improvement thereto I secure to cross bars 6 of such guide frame uprights 7 forming what will be hereinafter termed track bars. Guide bars 8 are secured to the form 5 at their lower ends by any preferred connection preferably by forming said guide bars of metal and bending their lower ends at right angles to form arms 9 which may be securely fastened to the ledge of the form. Connection between the guide bars 8 and form is such that while the guide bars remain vertical the form is at all times horizontal, as clearly shown in the drawings. The guide bars are of considerable length and at their upper ends, it being understood that there are two of said guide bars, one at each end of the form, said guide bars coöperate with groove rollers 10 secured to an appropriate part of the press frame, so that said guide bars are accurately guided in vertical position at all times. The lower ends of the guide bars, or those ends adjacent the form, are provided with guide rollers 11 which at all times bear upon the track bars 7, so that the form is accurately guided in its vertical movement.

Secured to the guide bars 8 preferably at points adjacent the lower ends thereof are endless sprocket chains 12 which pass over upper and lower sprocket wheels 13 and 14 secured to appropriate points of the frame preferably above and below the extreme positions of the form in use. The chains 12 are provided with counterbalanced weights 15 which practically counterbalance the weight of the parts on the opposite side of the chain, so that the form when moved to any position will be held in such position by the counterbalanced weights.

In operation, the form by reason of its connection to the guide rods 8 is maintained at all times in a horizontal position and by the chain connection and counterbalance weights may be readily moved to its uppermost or inoperative position or to its lowermost position to provide for the formation of a fruit layer. By reason of the counterbalance it will be obvious that the operator by grasping the form at any point may with little exertion and the use of the one hand move the form to an operative or inoperative position in a convenient manner, the coöperation of the form with the usual guide frame serving in addition to the guide rods 8 and means to similarly position the form in each successive application thereof.

By the invention all necessity for completely lifting the frame through the manual exertion of the operator and securing it in inoperative position is avoided, the frame remaining by the present improvement at all times in proper position to be conveniently lowered and accurately positioned by the simple act of lowering, the return of the form to inoperative or elevated position requiring merely a slight upward pull or pressure.

The invention avoids the loss of time required in the handling of the frame necessary under previous conditions and in this particular alone materially reduces the time required in making up the desired number of fruit layers and, therefore, will increase the daily output as compared with that of previous constructions.

What is claimed is:

1. A charger for fruit press including a form and a counterbalance connected with the form to hold the latter in any set position.

2. A charger for fruit press including a form, means for guiding the form in movement and a counterbalance for the weight of the form.

3. A charger for fruit press including a form, means for guiding the form to maintain a horizontal position of the latter in movement and a counterbalance for the weight of the form.

4. A charger for fruit press including a form, guide bars connected to and movable with the form and serving to maintain a horizontal position of the form, carrier chains connected with the form and counterbalance weights carried by said chains.

5. A charger for fruit press including a form and guide frame therefor, guide bars connected to the form to maintain the horizontal position of the latter, chains connected to the guide bars, rollers over which said chains are arranged to travel and counterbalance weights carried by the chains.

6. A charger for fruit presses including a form, means for guiding the form in movement, said means preventing tilting of the form, and a counterbalance for the form.

7. A charger for fruit presses including a form, means connected thereto for guiding the form in the vertical plane in movement, the connection between said means and form serving to maintain the latter horizontal under all conditions, and a counterbalance for the weight of the frame in movement.

In testimony whereof I affix my signature in presence of two witnesses.

WILLIAM H. MYERS.

Witnesses:
 HOMER C. HENKLE,
 JACOB C. MYERS.